US008500321B2

(12) United States Patent  
Simnioniw et al.

(10) Patent No.: US 8,500,321 B2  
(45) Date of Patent: Aug. 6, 2013

(54) COLLAPSIBLE WATER CIRCULATION SYSTEM FOR ENCLOSED TANKS

(75) Inventors: Corey M. Simnioniw, Dickinson, ND (US); Gary A. Kudrna, Dickinson, ND (US); Willard R. Tormaschy, Dickinson, ND (US); Jonathan L. Zent, Dickinson, ND (US); Joel J. Bleth, Dickinson, ND (US)

(73) Assignee: Medora Environmental, Inc., Dickinson, ND (US)

( * ) Notice: Subject to any disclaimer, the term of this patent is extended or adjusted under 35 U.S.C. 154(b) by 538 days.

(21) Appl. No.: 12/725,197

(22) Filed: Mar. 16, 2010

(65) Prior Publication Data

US 2010/0236647 A1   Sep. 23, 2010

Related U.S. Application Data

(60) Provisional application No. 61/160,871, filed on Mar. 17, 2009.

(51) Int. Cl.  
*B01F 5/10* (2006.01)

(52) U.S. Cl.  
USPC .................................. 366/264; 415/7; 417/61

(58) Field of Classification Search  
USPC .................. 366/262–266, 270, 308; 261/91, 261/120; 417/61; 415/7; 210/170.01–170.11, 210/121, 242.1–242.4, 220–221.2; 416/142–143  
See application file for complete search history.

(56) References Cited

U.S. PATENT DOCUMENTS

| | | | | |
|---|---|---|---|---|
| 2,991,622 | A * | 7/1961 | Oster | 405/61 |
| 6,241,221 | B1 * | 6/2001 | Wegner et al. | 261/93 |
| 6,432,302 | B1 * | 8/2002 | Obritsch et al. | 210/170.05 |
| 6,439,853 | B2 * | 8/2002 | Tormaschy et al. | 417/53 |
| 7,285,208 | B2 * | 10/2007 | Tormaschy et al. | 210/170.05 |
| 7,306,719 | B2 * | 12/2007 | Tormaschy et al. | 210/170.05 |
| 7,331,569 | B2 * | 2/2008 | Reusche et al. | 261/36.1 |
| 7,517,460 | B2 * | 4/2009 | Tormaschy et al. | 210/754 |
| 7,641,792 | B2 * | 1/2010 | Tormaschy et al. | 210/198.1 |
| 7,670,044 | B2 * | 3/2010 | Tormaschy et al. | 366/264 |
| 7,789,553 | B2 * | 9/2010 | Tormaschy et al. | 366/262 |

(Continued)

FOREIGN PATENT DOCUMENTS

FR          2825082 A1 * 11/2002

OTHER PUBLICATIONS

Potable Water Units for Small to Medium Size (0.1-3 MG) Tanks, 2009, 1 page, SolarBee, Inc., Dickinson, ND.

*Primary Examiner* — Charles E Cooley  
(74) *Attorney, Agent, or Firm* — W. Scott Carson

(57) ABSTRACT

A collapsible water circulation system for relatively small, enclosed tanks such as used by municipalities, fire districts, and industries. The system in its collapsed configuration is designed to fit through the often small access opening in the tank and then to automatically expand to its extended operating configuration, all without the need for any personnel to enter the tank. The system includes a draft tube extending downwardly from a distribution dish to an inlet anchored on the floor of the tank. The system also includes at least three, elongated flotation arms that can be deployed to extend substantially horizontally and outwardly of the dish. An impeller within the dish is operated to draw water up from the anchored inlet through the draft tube to the dish. The water subsequently passes upwardly through the dish over its upper lip and substantially radially outwardly of it. The flotation arms are pivotally mounted to the system above the dish and are free to pivot between their collapsed and predetermined deployed positions.

24 Claims, 9 Drawing Sheets

U.S. PATENT DOCUMENTS

| | | | |
|---|---|---|---|
| 7,798,784 B2* | 9/2010 | Tormaschy et al. | 417/61 |
| 7,850,433 B2* | 12/2010 | Tormaschy et al. | 417/61 |
| 7,906,017 B2* | 3/2011 | Tormaschy et al. | 210/170.05 |
| 7,934,705 B2* | 5/2011 | Sun et al. | 261/87 |
| 7,967,498 B2* | 6/2011 | Van Den Berg | 366/136 |
| 8,057,091 B2* | 11/2011 | Tormaschy et al. | 366/264 |
| 2002/0001529 A1* | 1/2002 | Tormaschy et al. | 417/423.9 |
| 2003/0127754 A1* | 7/2003 | Ruzicka et al. | 261/93 |
| 2005/0061721 A1* | 3/2005 | Tormaschy et al. | 210/121 |
| 2005/0142011 A1* | 6/2005 | Tormaschy et al. | 417/423.15 |
| 2005/0155922 A1* | 7/2005 | Tormaschy et al. | 210/241 |
| 2007/0295672 A1* | 12/2007 | Tormaschy et al. | 210/754 |
| 2008/0000818 A1* | 1/2008 | Tormaschy et al. | 210/121 |
| 2008/0002517 A1* | 1/2008 | Tormaschy et al. | 366/142 |
| 2008/0047497 A1* | 2/2008 | Reusche et al. | 119/69.5 |
| 2008/0049547 A1* | 2/2008 | Reusche et al. | 366/142 |
| 2008/0087586 A1* | 4/2008 | Tormaschy et al. | 210/85 |
| 2008/0087610 A1* | 4/2008 | Tormaschy et al. | 210/747 |
| 2008/0112820 A1* | 5/2008 | Tormaschy et al. | 417/61 |
| 2008/0128344 A1* | 6/2008 | Tormaschy et al. | 210/170.05 |
| 2008/0169229 A1* | 7/2008 | Tormaschy et al. | 210/170.05 |
| 2009/0134083 A1* | 5/2009 | Tormaschy et al. | 210/198.1 |
| 2010/0092285 A1* | 4/2010 | Tormaschy et al. | 415/211.2 |
| 2010/0109170 A1* | 5/2010 | Sun et al. | 261/87 |
| 2010/0236647 A1* | 9/2010 | Simnioniw et al. | 137/565.01 |
| 2011/0129338 A1* | 6/2011 | Tormaschy et al. | 415/211.2 |
| 2012/0067799 A1* | 3/2012 | Simnioniw et al. | 210/170.05 |

* cited by examiner

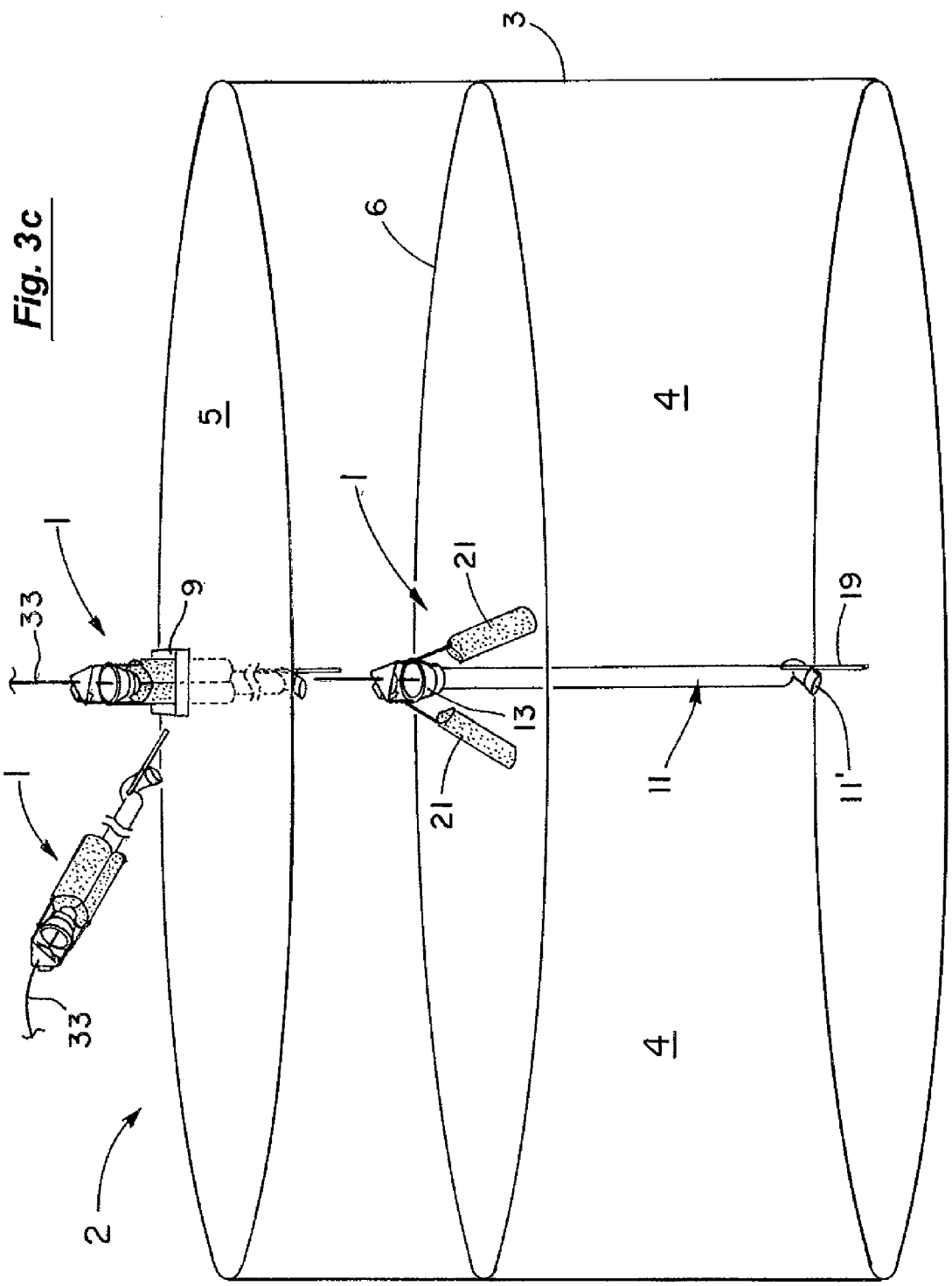

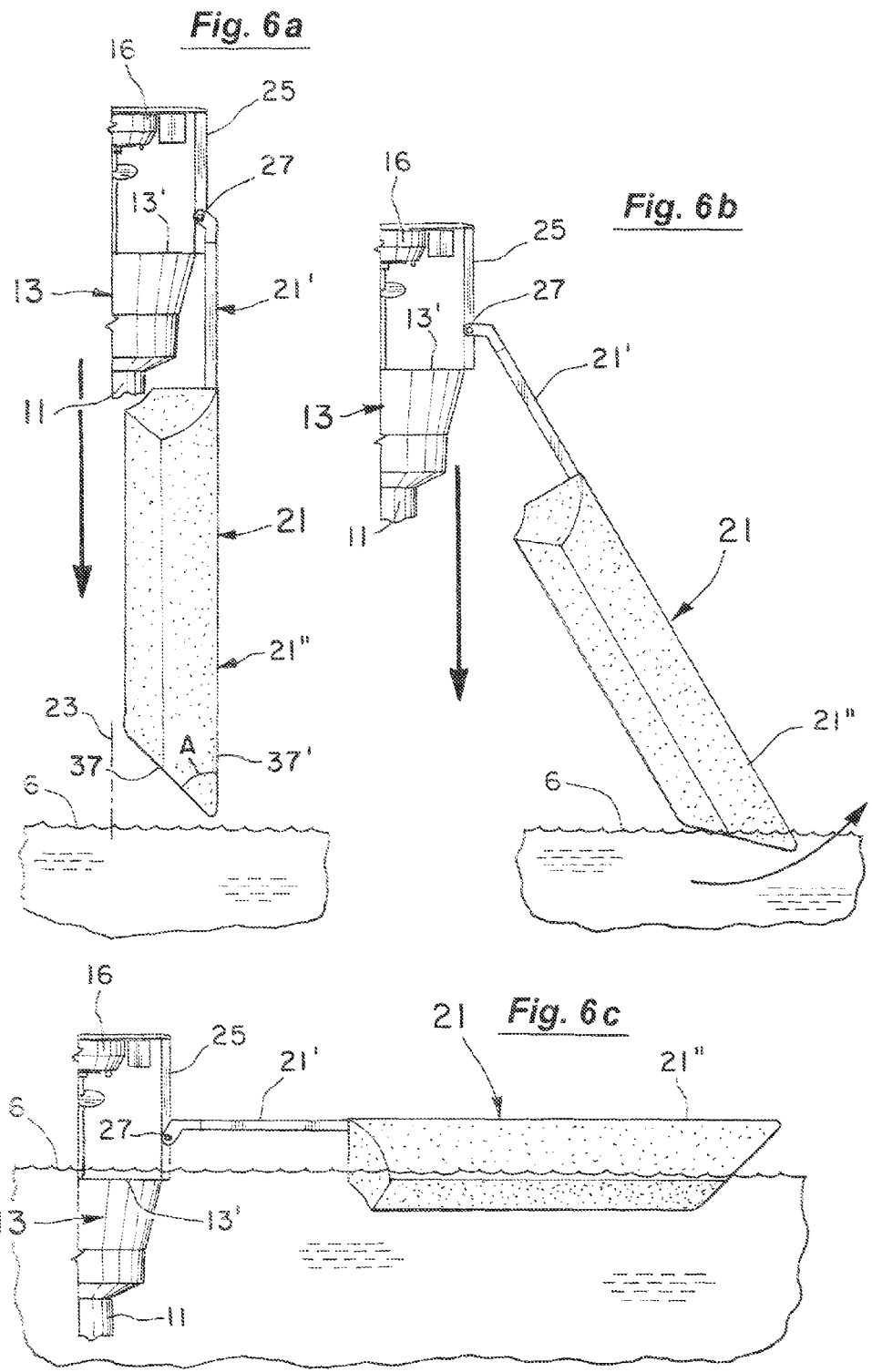

COLLAPSIBLE WATER CIRCULATION SYSTEM FOR ENCLOSED TANKS

RELATED APPLICATIONS

This application claims the benefit of U.S. Provisional Patent Application Ser. No. 61/160,871 filed Mar. 17, 2009, which is incorporated herein by reference.

BACKGROUND OF THE INVENTION

1. Field of the Invention

This invention relates to the field of circulation systems for water tanks and more particularly to the field of circulations systems for relative small and enclosed tanks such as used for municipalities, fire protection, and industrial purposes.

2. Discussion of the Background

Municipalities, fire districts, and industries commonly use relatively small, enclosed water tanks. Such tanks typically hold about 300,000 or so gallons and are about 50-75 feet wide and 30 or more feet high. The water in these tanks is preferably kept mixed by an internal circulation system to maintain its freshness, particularly in municipal water tanks, and to avoid water quality problems such as bacteria growth and nitrite development.

A physical problem with many such tanks is that they normally have only a relatively small access opening (e.g., 18-24 inches wide) which is designed primarily just to permit an individual worker to pass through to inspect or repair the tank. Consequently, many circulation systems if they are going to be used in the tank must be passed through the access opening in nearly completely disassembled or at least partially disassembled condition. One or more workers must then enter the tank to assemble the system. This often requires special, elaborate, and costly training and following strict regulatory and other safety procedures. Special equipment must also often be used such as winches to lower the workers, tethered tools, safety lines, air monitors, inflatable rafts, and even diving gear as well as rescue personnel standing by. Additionally, it can require that the tank be taken off line or out of service and even drained. Alternate sources must often then be arranged to temporarily supply water to customers and for fire protection. Any unexpected or prolonged delays in bringing the tank back on line can thereafter be quite costly and in some cases present safety concerns to the community. The same problems are presented if the circulation system placed in the tank subsequently breaks down and workers must enter the tank to repair it.

With these and other concerns in mind, the present invention was developed. In it, a circulation system is provided that can be collapsed to fit through the relatively small access opening of the tank. Additionally, the circulation system is designed to thereafter automatically deploy its flotation arms without the need for any workers to enter the tank.

SUMMARY OF THE INVENTION

This invention involves a collapsible water circulation system for relatively small, enclosed tanks such as used by municipalities, fire districts, and industries. The system in its collapsed configuration is designed to fit through the often small access opening in the tank and then to automatically expand to its extended operating configuration, all without the need for any personnel to enter the tank.

The system includes a draft tube extending downwardly from a distribution dish to an inlet anchored on the floor of the tank. The system also includes at least three, elongated flotation arms that can be deployed to extend substantially horizontally and outwardly of the dish. An impeller within the dish is operated to draw water up from the anchored inlet through the draft tube to the distribution dish. The water subsequently passes upwardly through the dish over its upper lip and substantially radially outwardly of it. The flotation arms are pivotally mounted to the system above the dish and are free to pivot between collapsed and deployed positions. In the collapsed positions, the flotation arms extend substantially vertically downwardly along the draft tube wherein the entire system can be lowered through the small access opening in the tank. In the deployed positions, the flotation arms as indicated above extend substantially horizontally and outwardly of the dish.

The flotation arms as previously mentioned are free to pivot between their collapsed and deployed positions. In this regard, the outer end or tip portion of each flotation arm preferably has an inclined surface that will create a force on each arm as it is lowered into the water that will move the arm upwardly from its collapsed position toward its deployed position. Each arm additionally has a stop mechanism to prevent it from moving upwardly past a predetermined deployed position.

With the flotation arms in their predetermined deployed positions, the distribution dish is then supported with its upper lip submerged at a predetermined depth below the water surface and in a level position. A gentle, substantially laminar flow can then be created throughout the entire tank for complete and uniform mixing of the water. A delivery line for disinfectant (e.g., chlorine) is also provided to extend downwardly from the top wall of the tank to the anchored inlet of the draft tube or the dish to quickly and efficiently add disinfectant as needed. To withdraw the system from the tank, the installation steps can simply be reversed wherein the flotation arms will automatically move under their own weight to their collapsed positions as they are raised above the water. The collapsed system can then be drawn up through the small access opening in the tank, again without the need for any personnel to enter the tank.

BRIEF DESCRIPTION OF THE DRAWINGS

FIG. 3c sequentially illustrates how the collapsed system can be lowered through the small access opening in the top wall of the tank.

FIG. 4c is a top plan view taken along line 4c-4c of FIG. 4a.

FIGS. 6a-6c sequentially show how the flotation arms are automatically moved from their collapsed positions to their deployed positions as the system is lowered into the tank water.

DETAILED DESCRIPTION OF THE INVENTION

Figure 1:
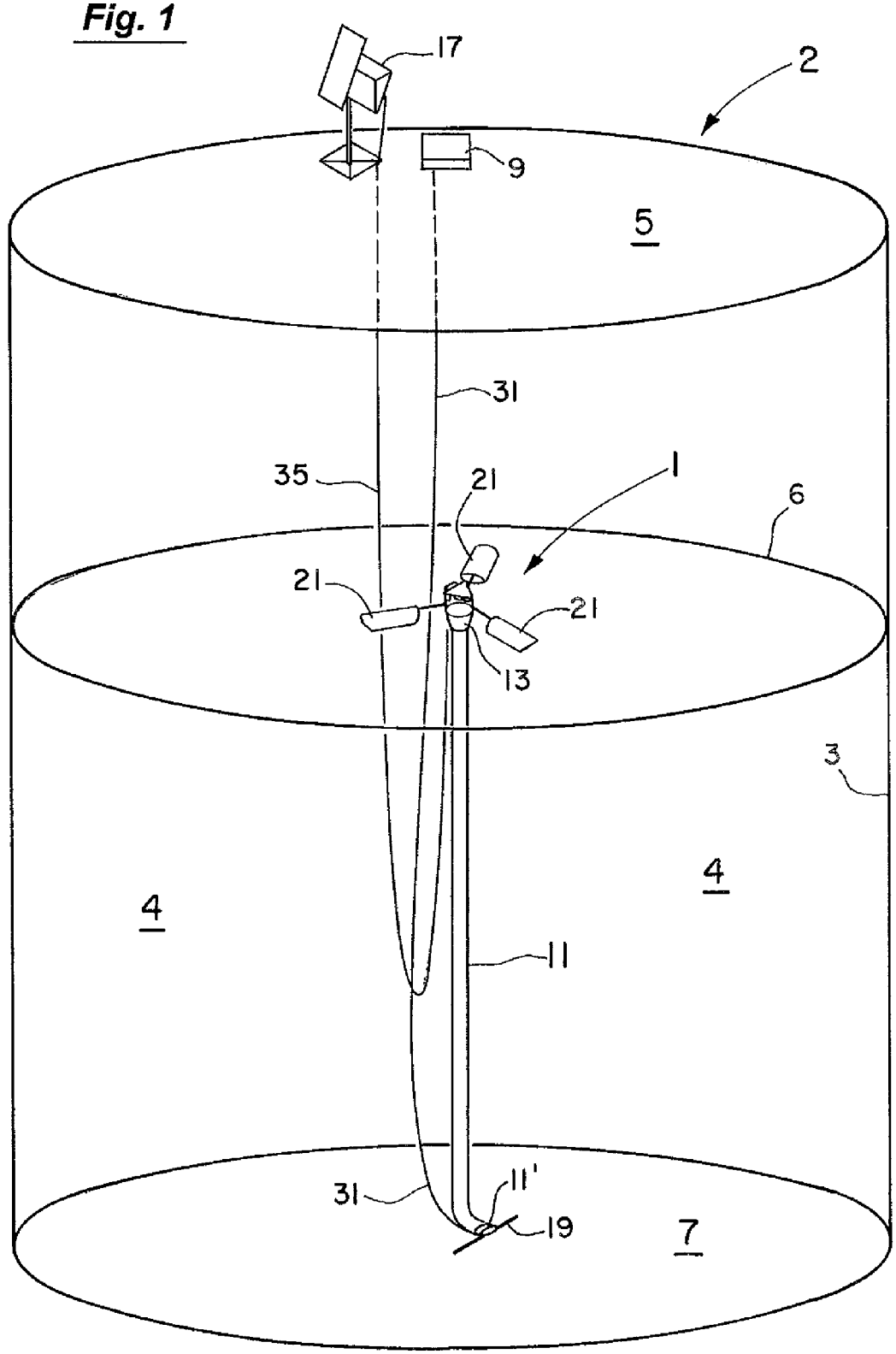
FIG. 1 illustrates the circulation system of the present invention in its deployed, operating configuration within a water tank.
Figure 2:
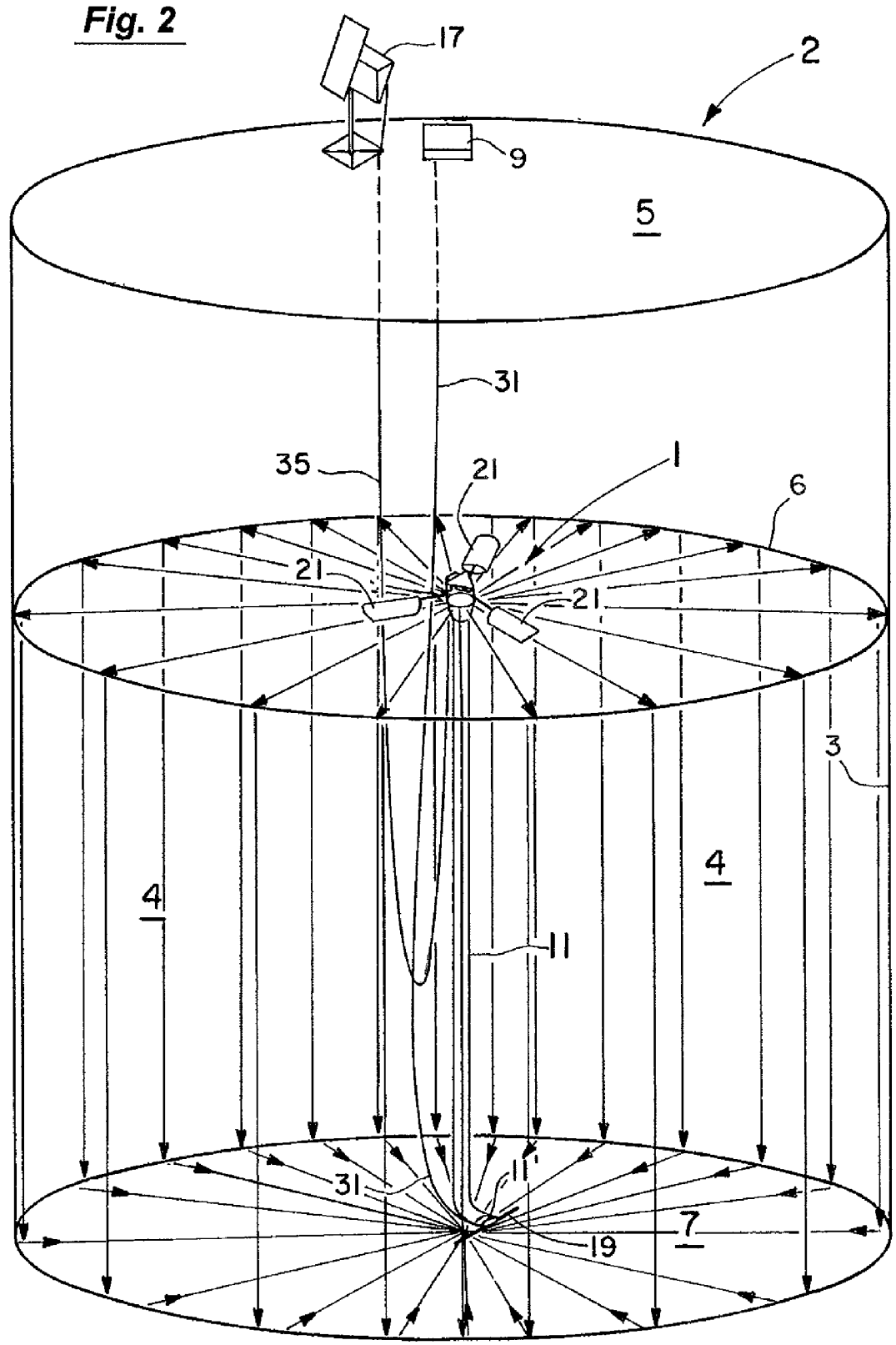
FIG. 2 is a view similar to FIG. 1 showing the substantially laminar flow created by the circulation in the tank to thoroughly and completely mix the water.
Figure 3A:
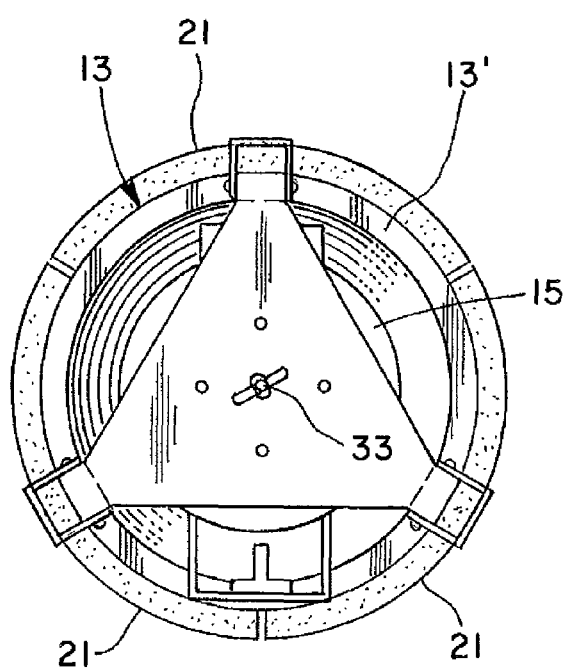
FIG. 3a is a top plan view of the circulation system in its collapsed configuration.

As shown in FIGS. 1 and 2, the circulation system 1 of the present invention is primarily intended for use to circulate water (FIG. 2) in an enclosed water tank 2. Such tanks 2 are commonly used to contain water for municipalities, fire prevention, and industrial purposes. The tanks 2 typically have side and top walls 3, 5 and a floor 7. The tank size can vary but usually is relatively small (e.g., 300,000 gallons, 50-75 feet wide, and 30 or more feet high) compared to open reservoirs. The tanks 2 also typically have fairly small access openings at 9 (e.g., 18-24 inches wide) in the top wall 5 primarily designed to permit a single worker to pass through to inspect or repair the interior of the tank 2. The present circulation system 1 of FIGS. 1-2 in this regard has been specifically designed to be collapsible to a reduced size as in FIGS. 3a-3c to fit through the small access opening 9 (FIG. 3c). The circulation system 1 has also been specifically designed to automatically deploy to the extended operational configuration of FIGS. 1-2 as the system 1 is lowered into the tank water.

More specifically, the circulation system 1 of the present invention has a draft tube 11 (see FIGS. 1 and 4a), distribution dish 13 (FIG. 4a), and impeller 15 (FIG. 4a) positioned within the distribution dish 13. The distribution dish 13 is driven by the motor 16 which is preferably solar powered at 17 in FIG. 1. The draft tube 11 of FIG. 1 depends downwardly from the distribution dish 13 to the inlet 11' that is anchored by the bar 19 or other weight to rest on the tank floor 7 (see also FIGS. 4a-4b). The flexible draft tube 11 (e.g., thermoplastic rubber) is preferably longer than the maximum depth of the water so the draft tube 11 will assume an "L" shape as shown with the inlet 11' extending substantially horizontally. The impeller 15 of FIG. 4a then draws water substantially horizontally and immediately adjacent the tank floor 7 as illustrated in FIG. 2 into the inlet 11' and up the draft tube 11 to the distribution dish 13. From the distribution dish 13, the water passes up over the submerged lip 13' of the distribution dish 13 (FIG. 4a) and radially outwardly of the distribution dish 13 as shown in FIG. 2.

Figure 4A:
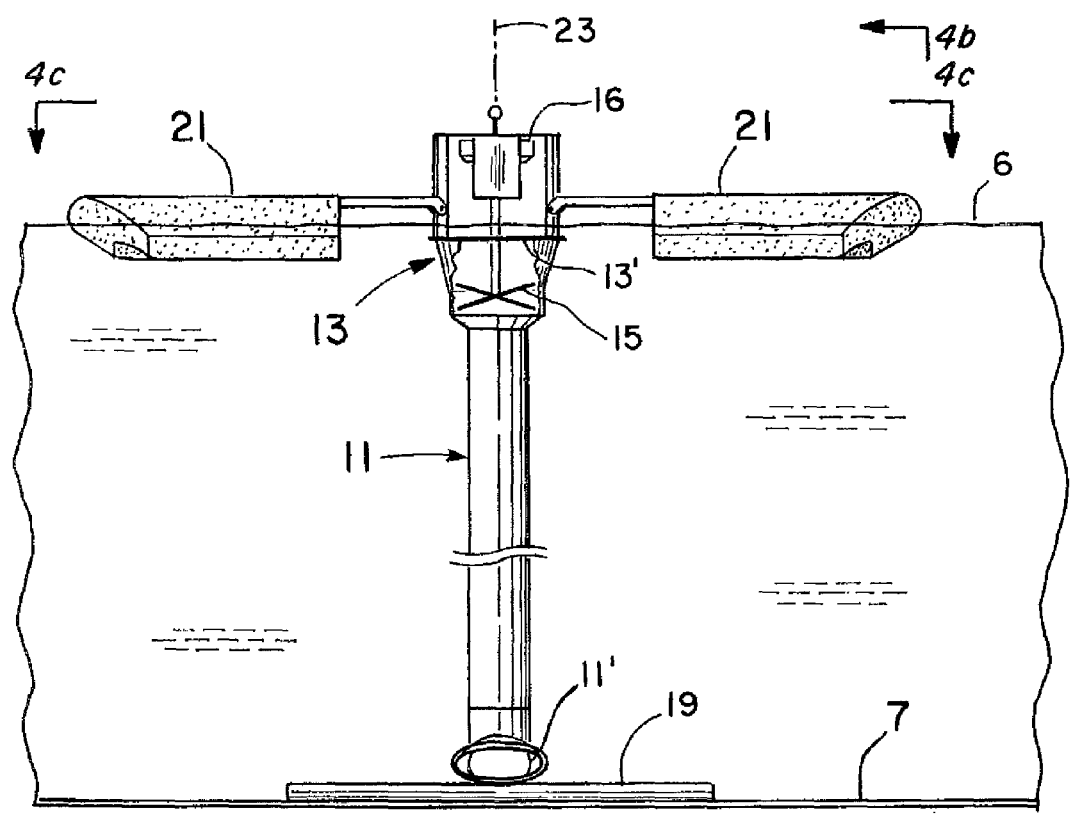
FIG. 4a is a front view of the circulation system in its deployed position.
Figure 4B:
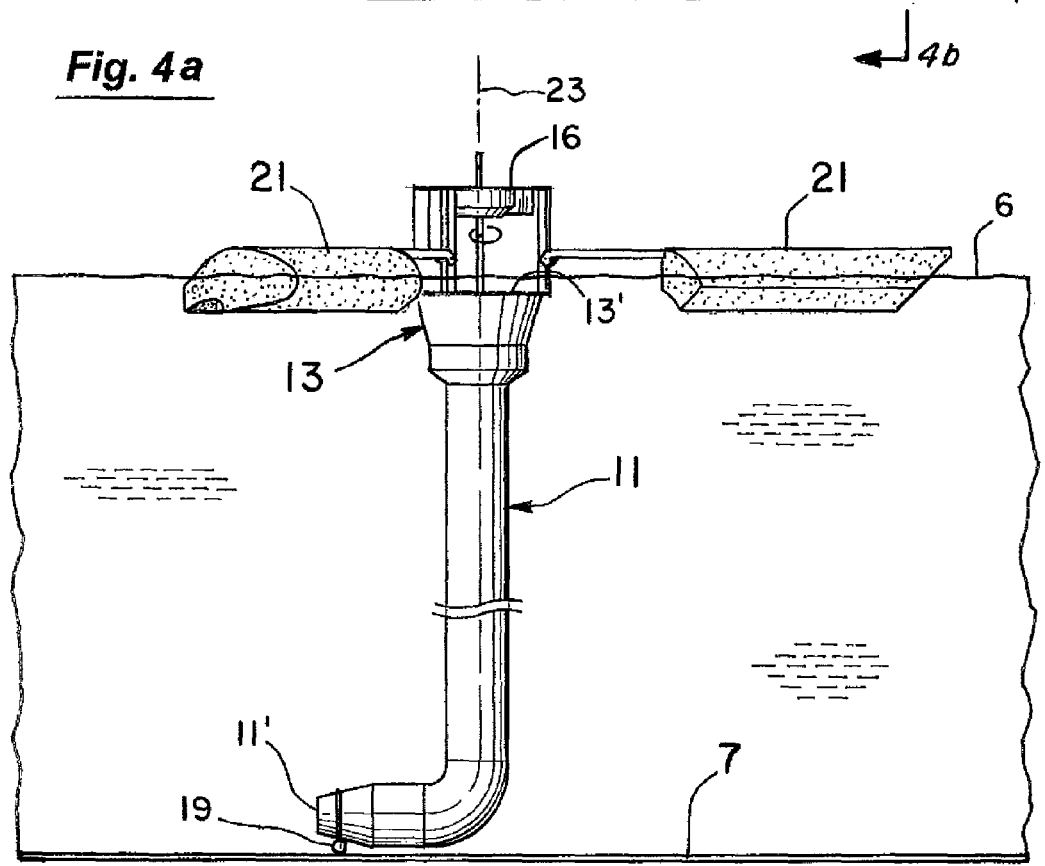
FIG. 4b is a side view of the deployed system.
Figure 4C:
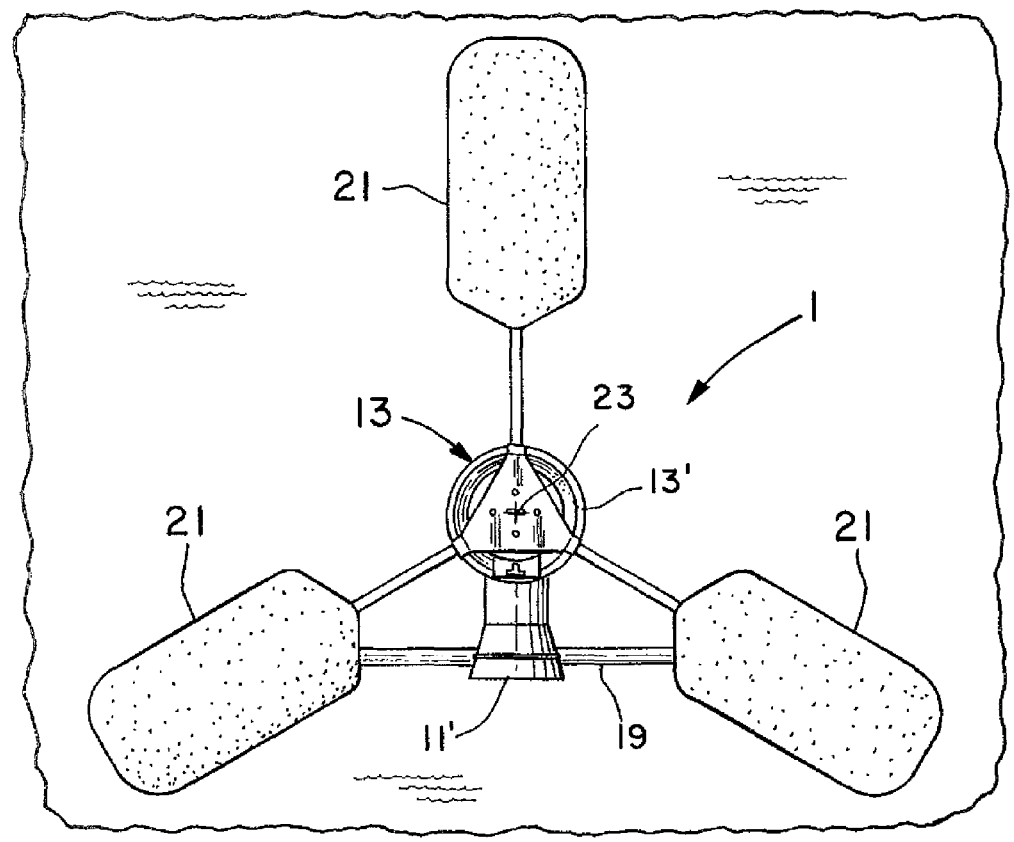
Figure 4D:
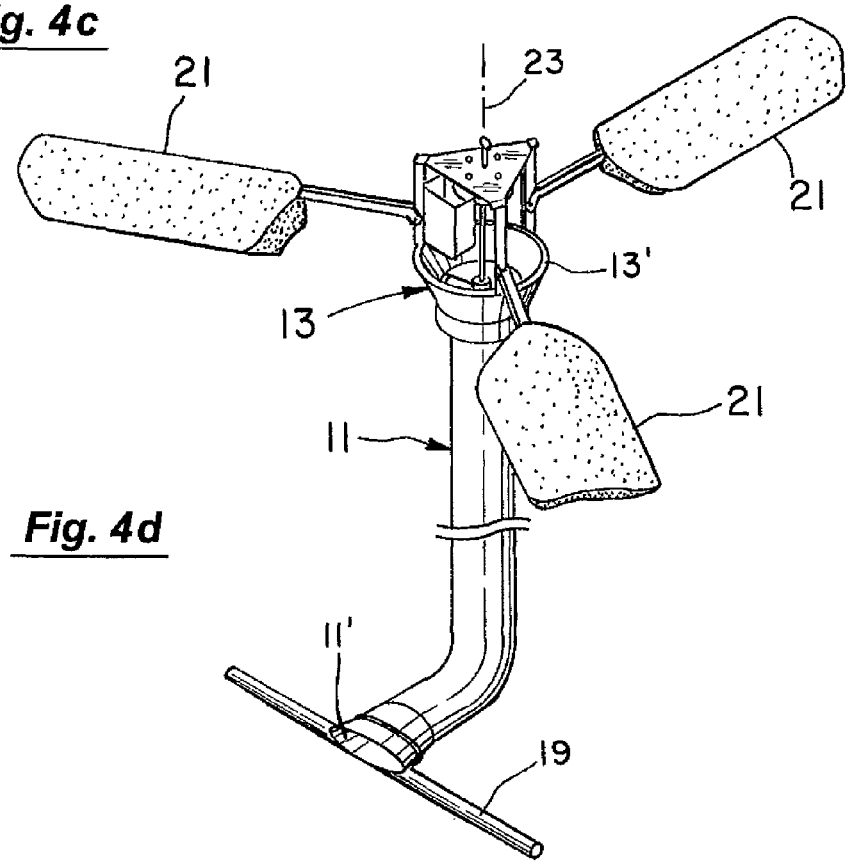
FIG. 4d is a perspective view of the deployed system.
Figure 5A:
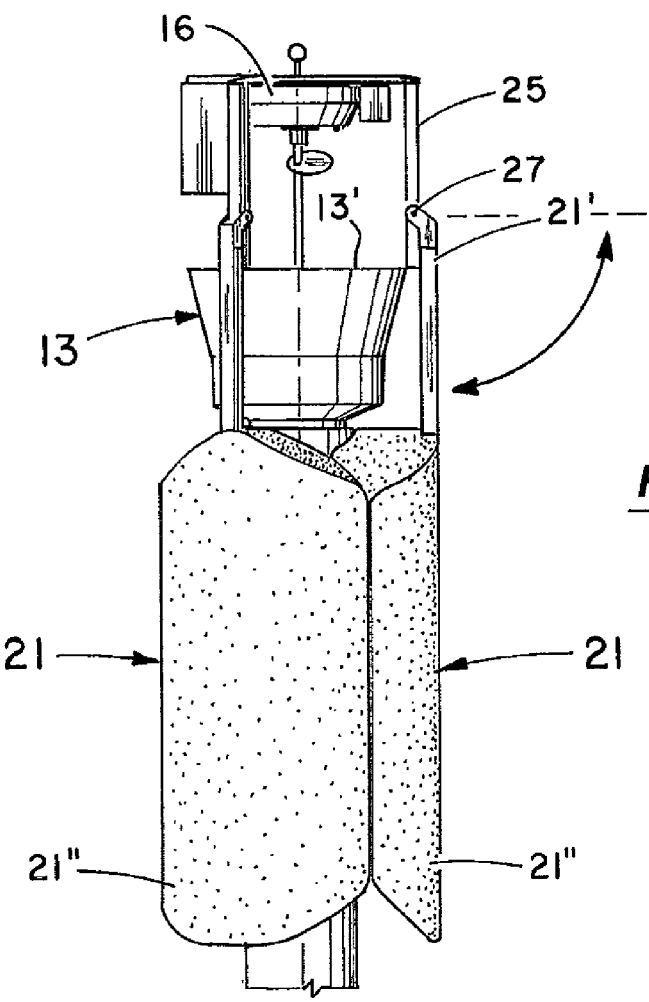
FIG. 5a is an enlarged view of the collapsed system with the flotation arms extending downwardly along the draft tube.
Figure 5B:
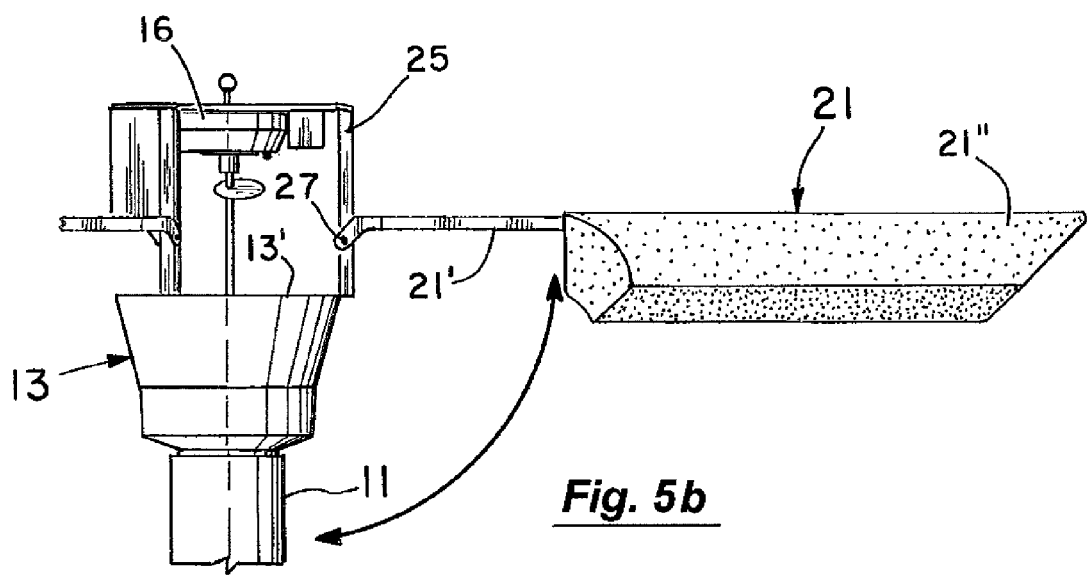
FIG. 5b illustrates one embodiment of a stop mechanism to prevent each flotation arm from moving upwardly past its predetermined deployed position extending substantially horizontally and outwardly of the distribution dish.
Figure 5C:
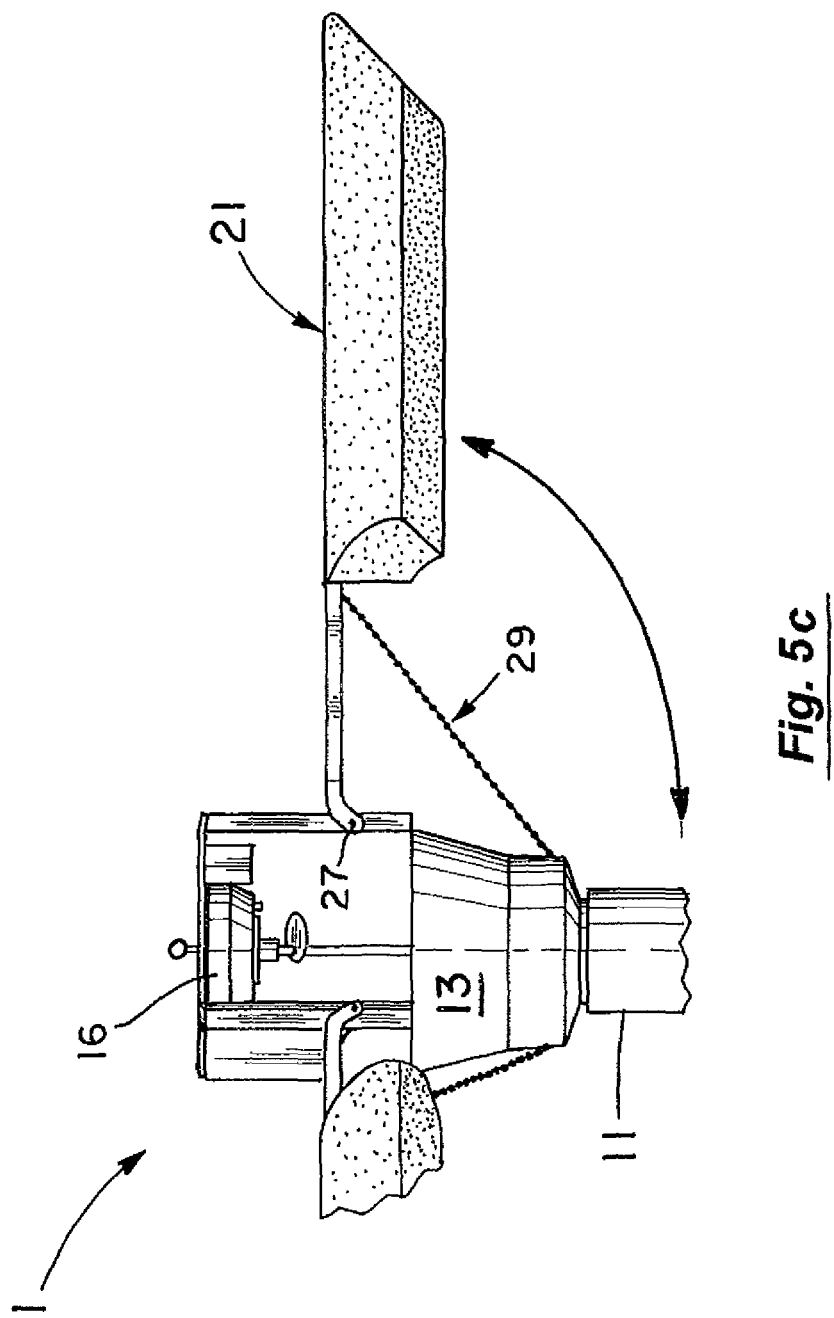
FIG. 5c illustrates a second embodiment of the stop mechanism for each flotation arm.

The circulation system 1 further includes at least three flotation arms 21 that extend radially outwardly of the distribution dish 13 in their deployed positions of FIGS. 1 and 4c-4d. The flotation arms 21 as shown are preferably evenly spaced about the distribution dish 13 and substantially vertical axis 23. Each elongated flotation arm 21 at its inner end or tip portion 21' (see FIGS. 5a-5b) is mounted adjacent and preferably above the upper lip 13' of the distribution dish 13 to a support member 25. Each flotation arm 21 in this regard is mounted for pivotal movement (FIGS. 5a-5b) about a substantially horizontal axis 27 with the inner end portion 21' of the flotation arm 21 in the collapsed position of FIG. 5a extending downwardly slightly outside the distribution dish 13. The pivotal movement is preferably unrestrained in that each flotation arm 21 is free to move between its collapsed position of FIG. 5a and its deployed position of FIG. 5b. In the deployed position, each flotation arm 21 as shown in FIGS. 4a-4c and 5b extends substantially horizontally and radially outwardly of the distribution dish 13. The flotation arms 21 preferably extend essentially straight out from their substantially linear, inner end portions 21'. The inner end portions 21' extend (e.g., 1.5 feet) out from the pivotal axes 27 as shown preferably above the water surface 6 to the floats (e.g., 3 foot long polystyrene encased in plastic and weighing about 15-20 pounds) at the outer end portions 21". The deployed position of each flotation arm 21 is predetermined in that each flotation arm 21 has a stop mechanism preventing the flotation arm 21 from moving upwardly from the collapsed position (FIG. 5a) past the deployed position of FIG. 5b. In the embodiment of FIG. 5b, the stop mechanism includes the inner end portion 21' of the flotation arm 21 abutting the support member 25. In the embodiment of FIG. 5c, a flexible member 29 (e.g., chain or rope) is attached between the flotation arm 21 and the distribution dish 13 or other member of the circulation system 1.

The predetermined deployed positions of the flotation arms 21 serve to set the depth (e.g., 0.75-1.5 inches) of the upper lip 13' of the distribution dish 13 in FIG. 4a below the surface 6 of the water in the tank. With the upper lip 13' of the distribution dish 13 so set at a predetermined depth below the surface 6 of the water and in a substantially level or horizontal position, the water drawn up through the draft tube 11 by the impeller 15 then passes radially and substantially uniformly outwardly of the distribution dish 13 over the lip 13'. Preferably, this movement is in a relatively gentle, substantially laminar flow manner to create the overall circulation pattern of FIG. 2 in the tank 2. The impeller 15 is preferably driven at a rate to draw up water (e.g., 75-80 gallons per minute through a 6 inch inner diameter draft tube 11) so the water passing out of the dish 13 does not break or significantly break the water surface 6 and a substantially laminar flow out to the side wall 3 of the tank 2 is created. The water then flows downwardly along the side wall 3 (FIG. 2) and inwardly back to the draft tube inlet 11'. Induced flows in the interior of the water 4 are also created within this outer pattern.

The substantially laminar operation of the circulation system 1 (versus more violent and turbulent, non-laminar aerators) also allows the motor 16 of the circulation system 1 to be powered by solar panels (e.g., 36 volts direct current/30 or fewer watts). This is a major advantage for power costs and safety and in areas where access to normal power lines is not available or not readily available. Also, because of the overall, substantially laminar flow pattern, the water in the entire tank 2 is thoroughly and completely mixed. Consequently, the quality of the water can be sampled at relatively small locations anywhere in the tank 2 (due to the thorough, uniform mixing) and disinfectant (e.g., chlorine) added as needed through delivery line 31 in FIGS. 1-2.

The disinfectant through line 31 can be added as shown directly into the draft tube 11 through the side of the draft tube inlet 11' or immediately adjacent it. The disinfectant could also be added at other location along the draft tube 11 or at the distribution dish 13. Due to the nearly laminar flow, the disinfectant will be dispersed relatively quickly (e.g., 4-8 hours in smaller tanks and up to 48 hours in larger ones).

Figure 3B:
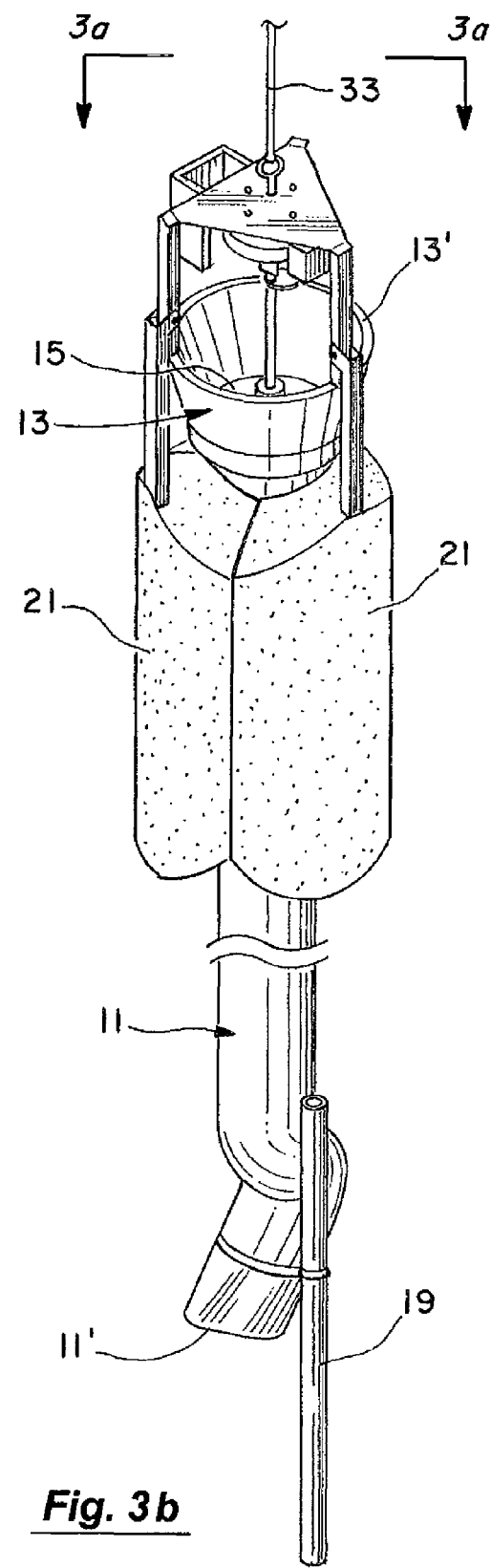
FIG. 3b is a perspective view of the collapsed system.

The flotation arms 21 of the present invention are preferably self deploying wherein the flotation arms 21 will automatically open or move from their collapsed positions of FIG. 3b to their deployed positions of FIGS. 1-2 and 4a-4d as the circulation system 1 is lowered into the tank 2 (FIG. 3c). In this manner, it is not necessary for an installer to actually enter the tank 2 and he or she can stay safely outside of the tank 2. More specifically, the collapsed circulation system 1 of FIGS. 3b-3c (e.g., 150 pounds and less than 18 inches across) can be manually lowered by one or more workers into the tank 2 through the access opening 9 (e.g., by attached rope 33 or the power line 35 to the motor 16). In doing so, the tapered, outer end or tip portion 21" of each flotation arm 21 (see FIGS. 6a-6c) will contact the water surface 6 and automatically be pivoted upwardly to move the flotation arm 21 to its deployed position of FIG. 6c. Each outer end or tip portion 21" in this regard has a an inner, first surface 37 (see FIG. 6a) which is inclined (e.g., 30-60 degrees and preferably about 45 degrees) upwardly and inwardly toward the draft tube 11 when the flotation arm 21 is in its collapsed position of FIGS. 5a and 6a. Each outer end or tip portion 21" (see again FIG. 6a) also has an outer, second surface 37' extending substantially vertically upwardly in the collapsed position of FIG. 6a and forming an acute angle A of substantially 45 degrees with the inner, first surface 37. This outer, second surface 37' in the collapsed position as also shown in FIG. 6a extends substantially vertically upwardly substantially to the inner end portion 21' of the flotation arm 21.

As the collapsed circulation system 1 is then lowered toward the water (FIG. 6a), a force is created on the flotation arm 21 at the surface 37. The force will positively move the flotation arm 21 about the pivotal axis 27 (FIG. 6b) upwardly toward and eventually to the predetermined deployed position of FIG. 6c. In this deployed position as shown, the flotation arm 21 extends substantially horizontally and radially outwardly of the distribution dish 13. The circulation system 1 in this regard can then be deployed without the installer having to enter the tank. The circulation system 1 can also be deployed while the tank is filled with water and in service without the need to drain the tank or otherwise take it off line. Conversely, because the pivotal movement of each flotation arm 21 is unrestricted or free between its deployed and collapsed positions, the steps of FIG. 3c can simply be reversed to remove the circulation system 1 from the tank 2. In doing so, the flotation arms 21 will automatically pivot downwardly under their own weight to their collapsed positions when the flotation arms 21 are raised out of the tank water. The collapsed system can then be removed through the access opening 9, again without the need for any personnel to enter the tank.

Additionally, due to this pivotal movement of the flotation arms 21 being unrestrained as discussed above, each flotation arm 21 can safely and naturally pivot downwardly as needed under its own weight when the tank 2 is emptied either intentionally or not. The most common such manner is that two of the flotation arms 21 may remain up or in their deployed positions resting on the tank floor and the third flotation arm 21 will then safely pivot downwardly to rest on the tank floor. Further, because the pivotal movement is unrestricted, the flotation arms 21 can subsequently move freely and automatically back to their deployed positions as the tank is again filled.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. In a collapsible circulation system for a body of water such as contained in an enclosed water tank having side and top walls and a floor with the top wall having a relatively small access opening to receive the collapsed circulation system therethrough, the circulation system having a distribution dish, draft tube depending downwardly from said distribution dish to an inlet, and an impeller positioned to draw water up the draft tube from the inlet thereof to the distribution dish, the circulation system further including at least three, elongated flotation arms extending between respective inner end portions and outer end portions along respective longitudinal first axes, the inner end portions of said flotation arms being respectively mounted adjacent the distribution dish for pivotal movement about respective substantially horizontal second axes to collapsed positions extending substantially vertically downwardly along and outside of said draft tube, the improvement wherein the outer end portion of at least one flotation arm is tapered to thereby create a force on the flotation arm as the flotation arm is lowered into the water in the tank to move the flotation arm about the pivotal axis thereof from said collapsed position extending vertically downwardly along and outside of said draft tube upwardly toward a deployed position on the surface of said body of water extending substantially horizontally and radially outwardly of said distribution dish to support said dish, draft tube, and impeller wherein the longitudinal first axis of said one elongated flotation arm extends substantially vertically downwardly from said inner end portion in said collapsed position and the tapered outer end portion of said one flotation arm in said collapsed position includes an inner, first surface inclined substantially 45 degrees from the horizontal upwardly and inwardly toward said draft tube and said tapered outer end portion of said one flotation arm in said collapsed position further includes an outer, second surface extending substantially vertically upwardly and forming an acute angle of substantially 45 degrees with said inner, first surface.

2. The improvement of claim 1 wherein the outer, second surface of the tapered outer end portion of said one flotation arm in said collapsed position extends vertically upwardly substantially to said inner end portion of said one flotation arm.

3. The improvement of claim 1 wherein said one flotation arm in said deployed position is free to pivot to said collapsed position with the longitudinal first axis of said one elongated flotation arm extending substantially vertically downwardly.

4. The improvement of claim 1 wherein each of said flotation arms has a tapered outer end portion with an inner, first surface inclined substantially 45 degrees from the horizontal upwardly and inwardly toward said draft tube in said collapsed position and said tapered outer end portion of each flotation arm in said collapsed position further includes an outer, second surface extending substantially vertically upwardly and forming an acute angle of substantially 45 degrees with said inner, first surface thereof.

5. The improvement of claim 4 wherein each flotation arm has a deployed position on the surface of the body of water extending substantially horizontally and radially outwardly of the distribution dish.

6. The improvement of claim 4 wherein the pivotal movement of each flotation arm between the deployed and collapsed positions is unrestricted and each flotation arm in said deployed position is free to pivot to said collapsed position with the longitudinal first axis of each elongated flotation arm extending substantially vertically downwardly.

7. The improvement of claim 1 wherein the inner end positions of said flotation arms extend downwardly in the respective collapsed positions outwardly of the distribution dish.

8. The improvement of claim 1 wherein said distribution dish has an upper lip extending substantially about an axis and said deployed flotation arms support said distribution dish with the lip thereof below the surface of the water in the tank wherein water drawn up through the draft by said impeller passes radially outwardly of said distribution dish over the lip thereof.

9. The improvement of claim 8 wherein the deployed flotation arms support the distribution dish with the lip thereof at a predetermined depth below the surface of the water in the tank.

10. The improvement of claim 8 wherein the lip of said distribution dish is supported substantially level at said predetermined depth.

11. The improvement of claim 8 wherein the respective inner end portions of the flotation arms are pivotally mounted to the circulation system above the lip of the distribution dish.

12. The improvement of claim 1 wherein said distribution dish has an upper lip extending substantially about an axis and the respective inner end portions of the flotation arms are pivotally mounted to the circulation system above the lip of the distribution dish.

13. The improvement of claim 12 wherein the inner end portions of said flotation arms are substantially linear members extending substantially horizontally and radially outwardly of the distribution dish above the surface of the water with the flotation arms in the deployed positions.

14. The improvement of claim 12 wherein the inner end positions of said flotation arms extend downwardly in the respective collapsed positions outwardly of the distribution dish.

15. The improvement of claim 1 wherein the one elongated flotation arm is mounted for pivotal movement about a single horizontal axis.

16. The improvement of claim 1 wherein each elongated flotation arm is mounted for pivotal movement about a single horizontal axis.

17. In a collapsible circulation system for a body of water such as contained in an enclosed water tank having side and top walls and a floor with the top wall having a relatively small access opening to receive the collapsed circulation system therethrough, the circulation system having a distribution dish, draft tube depending downwardly from said distribution dish to an inlet, and an impeller positioned to draw water up the draft tube from the inlet thereof to the distribution dish, the circulation system further including at least three, elongated flotation arms extending between respective inner end portions and outer end portions along respective longitudinal axes, the improvement wherein the inner end portions of said flotation arms are respectively mounted adjacent the distribution dish for unrestricted pivotal movement of the respective flotation arms about respective substantially horizontal second axes between respective predetermined deployed positions respectively extending substantially horizontally and radially outwardly of said distribution dish and collapsed positions respectively extending substantially vertically downwardly along and outside of said draft tube with the longitudinal axis of each elongated flotation arm extending substantially vertically downwardly from the respective inner end portion thereof.

18. The improvement of claim 17 wherein said distribution dish has an upper lip extending substantially about an axis and said deployed flotation arms support said distribution dish with the lip thereof below the surface of the water in the tank wherein water drawn up through the draft by said impeller passes radially outwardly of said distribution dish over the lip thereof.

19. The improvement of claim 18 wherein the deployed flotation arms support the distribution dish with the lip thereof at a predetermined depth below the surface of the water in the tank.

20. The improvement of claim 19 wherein the respective inner end portions of the flotation arms are pivotally mounted to the circulation system above the lip of the distribution dish.

21. The improvement of claim 17 wherein said distribution dish has an upper lip extending substantially about an axis and the respective inner end portions of the flotation arms are pivotally mounted to the circulation system above the lip of the distribution dish.

22. The improvement of claim 21 wherein the inner end portions of said flotation arms are substantially linear members extending substantially horizontally and radially outwardly of the distribution dish above the surface of the water with the flotation arms in the deployed positions.

23. The improvement of claim 21 wherein the inner end positions of said flotation arms extend downwardly in the respective collapsed positions outwardly of the distribution dish.

24. The improvement of claim 17 wherein each elongated flotation arm is mounted for pivotal movement about a single horizontal axis.

* * * * *